United States Patent
Han et al.

(10) Patent No.: US 8,699,628 B2
(45) Date of Patent: Apr. 15, 2014

(54) SIGNAL DEMODULATION METHOD AND APPARATUS AND SIGNAL MODULATION METHOD AND APPARATUS IN RETURN LINK OF SATELLITE SYSTEM

(75) Inventors: Jae-Hee Han, Daejeon-si (KR); Pan-Soo Kim, Daejeon-si (KR); Deock-Gil Oh, Daejeon-si (KR); Xavier Giraud, Versaillies (FR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 13/314,770

(22) Filed: Dec. 8, 2011

(65) Prior Publication Data

US 2012/0147939 A1    Jun. 14, 2012

(51) Int. Cl.
*H04L 27/00* (2006.01)
(52) U.S. Cl.
USPC ........... 375/324; 375/145; 375/149; 375/354; 370/324; 370/468; 370/509
(58) Field of Classification Search
USPC ......... 375/141, 145, 149, 326, 344, 354, 360, 375/368, 369; 370/321, 324, 337, 347, 468, 370/469, 476, 478, 491, 503, 509, 512
See application file for complete search history.

(56) References Cited

U.S. PATENT DOCUMENTS

| | | | |
|---|---|---|---|
| 6,539,003 B1 * | 3/2003 | Agarwal et al. | 370/324 |
| 8,243,859 B2 * | 8/2012 | Mo et al. | 375/343 |
| 2010/0128821 A1 | 5/2010 | Kim et al. | |
| 2011/0150123 A1 * | 6/2011 | Han et al. | 375/295 |

FOREIGN PATENT DOCUMENTS

KR    10-2010-0058310    6/2010

* cited by examiner

*Primary Examiner* — Dac Ha
(74) *Attorney, Agent, or Firm* — Staas & Halsey LLP

(57) ABSTRACT

A technology for modulating and demodulating a burst signal in a return link of a satellite system, in which the burst signal is modulated and transmitted from a transmission end of the return link and a symbol of the burst signal is identified and demodulated at a receiving end. The method includes estimating symbol timing of a burst received through the return link and synchronizing the estimated symbol timing of the burst to reference symbol timing; synchronizing a location of the timing-synchronized burst having the symbol timing synchronized to a location of a reference burst using a preamble symbol and a post-amble symbol of the timing-synchronized burst; and recovering a carrier of the location-synchronized burst whose location has been synchronized to the location of the reference burst using a pilot symbol of the location-synchronized burst.

10 Claims, 9 Drawing Sheets

SELECT

SIGNAL DEMODULATION METHOD AND APPARATUS AND SIGNAL MODULATION METHOD AND APPARATUS IN RETURN LINK OF SATELLITE SYSTEM

CROSS-REFERENCE TO RELATED APPLICATION(S)

This application claims the benefit under 35 U.S.C. §119(a) of Korean Patent Application No. 10-2010-0126476, filed on Dec. 10, 2010, in the Korean Intellectual Property Office, the entire disclosure of which is incorporated herein by reference for all purposes.

BACKGROUND

1. Field

The following description relates to a signal demodulation method and apparatus and a signal modulation method and apparatus, and more particularly, to a method and apparatus for demodulating a burst, which can increase transmission efficiency in a return link, and a method and apparatus for modulating the burst.

2. Description of the Related Art

Time division multiple access (TDMA) is a channel access method for shared medium networks, which allows multiple base stations to share the same frequency channel by dividing a signal into different time slots. TDMA is used for digital cellular phone communication. Particularly, multi-frequency time division multiple access (MF-TDMA) is a leading technology for dynamically sharing frequency band resources in an over-the-air and two-way communications network. Various MF-TDMA technologies have been widely used for multiple networks.

An MF-TDMA based digital transmission system essentially requires burst synchronization technology for a receiving end to determine a burst starting point, a carrier frequency error estimation and correction technology, a symbol timing synchronization technology, and the like. There is a rising need to increase band efficiency per bandwidth more than the conventional digital video broadcasting-return channel by satellite (DVB-RCS) and strengthen competitiveness to the very small aperture terminal (VSAT) standards.

Hence, to take into consideration both a linear modulation technique that is a physical to layer specification of Digital Video Broadcasting—Return Channel by Satellite for Next Generation (DVB-RCS NG) and a continuous phase modulation technique, the physical layer specification of DVB-RCS NG requires modification of a burst structure and a demodulation function of a receiving end that is suitable to the modified burst structure.

SUMMARY

The following description relates to a technology for modulating and demodulating a burst signal in a return link of a satellite system, in which the burst signal is modulated and transmitted from a transmission end of the return link and a symbol of the burst signal is identified and demodulated at a receiving end, thereby increasing a transfer rate in the return link.

In one general aspect, there is provided a method of demodulating a signal in a return link of a satellite system, including: estimating symbol timing of a burst received through the return link of the satellite system and synchronizing the estimated symbol timing of the burst to reference symbol timing; synchronizing a location of the timing-synchronized burst having the symbol timing synchronized to a location of a reference burst using a preamble symbol and a post-amble symbol of the timing-synchronized burst; and recovering a carrier of the location-synchronized burst whose location has been synchronized to the location of the reference burst using a pilot symbol of the location-synchronized burst.

In another general aspect, there is provided an apparatus for demodulating a signal in a return link of a satellite system, including: a symbol timing synchronizing unit configured to synchronize symbol timing of a burst received through the return link of the satellite system to reference symbol timing; a burst synchronizing unit configured to synchronize a location of the timing-synchronized burst of which the symbol timing has been synchronized by the symbol timing synchronizing unit to a location of a reference burst using a preamble symbol and a post-amble symbol of the timing-synchronized burst; and a carrier recovering unit configured to recover a carrier of the location-synchronized burst of which the location has been synchronized by the burst synchronizing unit using a pilot symbol of the location-synchronized burst.

In another general aspect, there is provided a method of modulating a signal in a return link of a satellite system, including: generating a payload symbol by modulating an encoded data bit using a predefined modulation scheme; generating a unique word into at least one of unique symbols including a preamble symbol, a post-amble symbol and a pilot symbol according to a type of a burst; and generating a burst by combining the payload symbol and the unique symbol.

In another general aspect, there is provided an apparatus for modulating a signal in a return link of a satellite system, including: a payload symbol generating unit configured to generate a payload symbol by modulating an encoded data bit using a predefined modulation scheme; a unique symbol generating unit configured to generate the unique word into a preamble symbol, a post-amble symbol, or a pilot symbol according to a type of a burst; and a burst generating unit configured to generate a burst by combining the symbols generated by the payload symbol generating unit and the unique symbol generating unit.

Other features and aspects may be apparent from the following detailed description, the drawings, and the claims.

Figure 1:
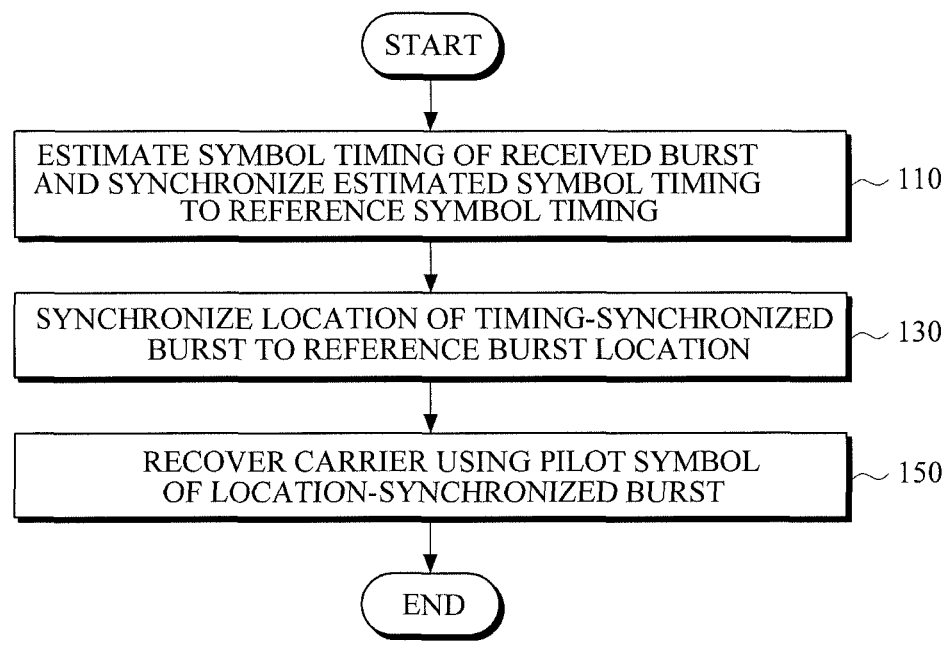
FIG. 1 is a flowchart illustrating an example of a demodulation method in a return link of a satellite system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a flowchart of an example of a demodulation method in a return link of a satellite system.

Referring to FIG. 1, symbol timing of a burst received through the return link of the is satellite system is estimated and synchronized to reference symbol timing (110). This is to correct a timing error occurring while a burst transmitted from a transmission end is passing through a channel. The estimation of symbol timing is performed using, for example, non-data aided Oerder & Myer algorithm. The estimated timing error is corrected to be matched to the reference symbol timing at the transmission end. Accordingly, due to the error having occurred while the burst was transmitted via the channel, the symbol timing of the burst is synchronized with the reference symbol timing.

Then, using a preamble symbol and a post-amble symbol of the timing-synchronized burst which has the symbol timing having synchronized with the reference symbol timing, a location of the timing synchronized burst is synchronized with a reference burst location (130). It is detected whether a burst is present in a time slot. If the burst is present in a time slot, a correlation value between the preamble symbol and the post-amble symbol of the received burst and a preamble symbol and a post-amble symbol of a burst at the transmission end is calculated. The burst is detected at a point where the correlation value is the maximum. In this case, a constant false alarm rate (CFAR) algorithm is used to detect the burst.

A burst consists of various symbols. Once the locations of a preamble symbol and a post-amble symbol are identified in a burst, a type of a burst can be recognized. The structure of a burst varies with the type of the burst. Through the identified type of the burst, it is possible to confirm whether or not the location of the received burst is identical to the location in the time slot at which a reference burst transmitted from the transmission end is placed. If the location of the received burst is not identical to the location of the reference burst from the transmission end, the error is corrected. The structure of the burst will be described in detail with reference to FIGS. 2A and 2B.

Figure 2A:
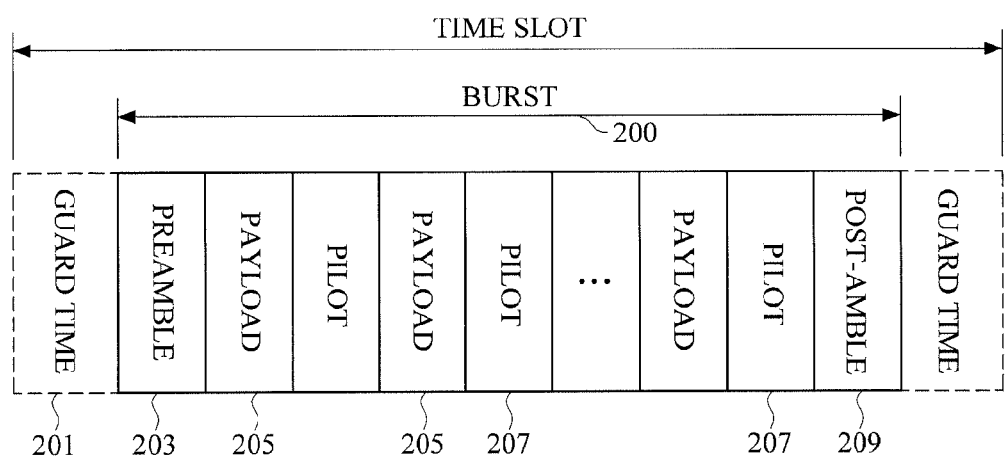
FIG. 2A is a diagram illustrating an example of a structure of a burst containing a pilot symbol.
Figure 2B:
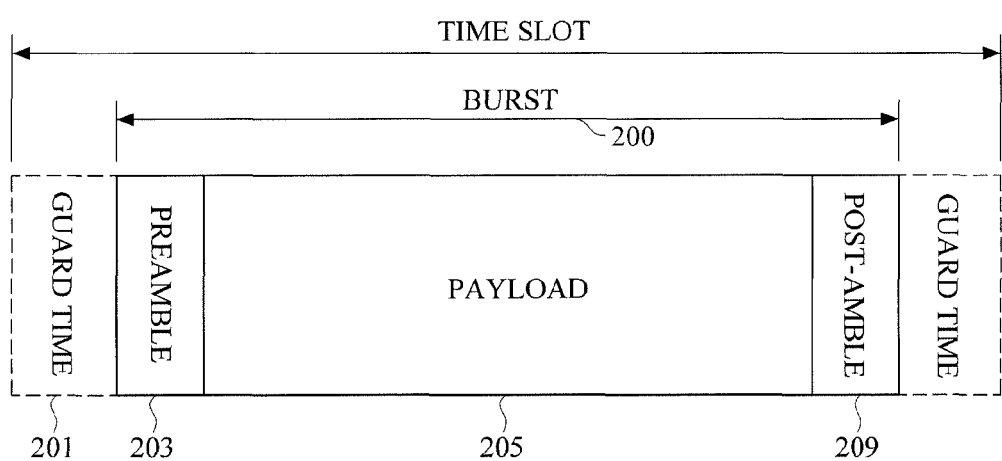
FIG. 2B is a diagram illustrating another example of a structure of a burst containing no pilot symbol.

FIG. 2A illustrates a diagram of an example of a structure of a burst containing a pilot symbol, and FIG. 2B illustrates a diagram of another example of a structure of a burst containing no pilot symbol.

Referring to FIG. 2A, in one time slot, a burst 200 and a guard time 201 are placed. The guard time 201 is a time provided for avoiding burst collision. The length of guard time 201 may be differentiated according to the purpose of use of the burst 200, the length of the burst 200, and the length of the time slot. The guard time 201 of each burst 200 may be determined according to the ambiguity of timing that is caused by an operating environment of a system. Examples of the burst 200 may include a log-on burst, a control burst, and a traffic burst. The traffic burst may be classified into a short traffic burst (STB) and a long traffic burst (LTB).

The burst 200 may consist of a preamble symbol, payload symbols, pilot symbols, and a post-amble symbol. Depending on the type of the burst 200, a preamble symbol 203, a pilot symbol 207, and a post-amble symbol 209 are generated. The pilot symbol 207 may be present or not according to the type of the burst 200. The burst 200 shown in the example illustrated in FIG. 2B does not include a pilot symbol. The pilot symbol 207, if present, is interposed between the payload symbols 205, which form a data section. That is, the payload symbols 207 and the pilot symbols 207 are alternately located between the preamble symbol 203 and the post-amble symbol 209.

Referring to FIG. 1 again, a carrier of the location-synchronized burst which has the to location synchronized with the location of the reference burst is recovered using a pilot symbol of the location synchronized burst (150). The carrier of the location synchronized burst is recovered by estimating and correcting a frequency error of the location synchronized burst, and estimating and correcting a phase error of the location-synchronized burst. A method for estimating the frequency error is differentiated according to the presence of a pilot symbol in the location-synchronized burst.

The frequency error estimation of the location-synchronized burst is performed using a data-aided scheme if a pilot symbol is present in the location-synchronized burst, and otherwise, the frequency error estimation is performed using a blind scheme. The data-aided frequency error estimation uses a Mengali & Morelli algorithm. In this case, by increasing the number of columns of pilot symbols in use, the estimation reliability can be enhanced. The blind frequency error estimation uses Rife & Boorstyn algorithm.

To recover a carrier, a signal to noise ratio (SNR) is estimated. If the burst is modulated in QPSK (Quadrature Phase Shift Keying)/8PSK (8-Phase Shift Keying) which is single-level modulation scheme, an SNR is estimated using a preamble symbol, a post-amble symbol, and a pilot symbol. If the burst is modulated in 16-QAM (Quadrature Amplitude Modulation) which is multi-level modulation scheme, all symbols in the burst are used to estimate an SNR. A power error is corrected using the SNR to maintain a signal level to be constant.

After the frequency error correction, the phase error is estimated and corrected. The phase error is estimated by calculating a correlation value between the preamble symbol and post-amble symbol of the received burst and the preamble symbol and post-amble symbol of the burst of the transmission end.

To recover the carrier, the preamble symbol, the post-amble symbol, and the pilot symbol of the received burst are removed, and thereby only payload symbols are left, which are data. The payload symbols are transmitted to a channel decoder which recovers the carrier.

Figure 3:
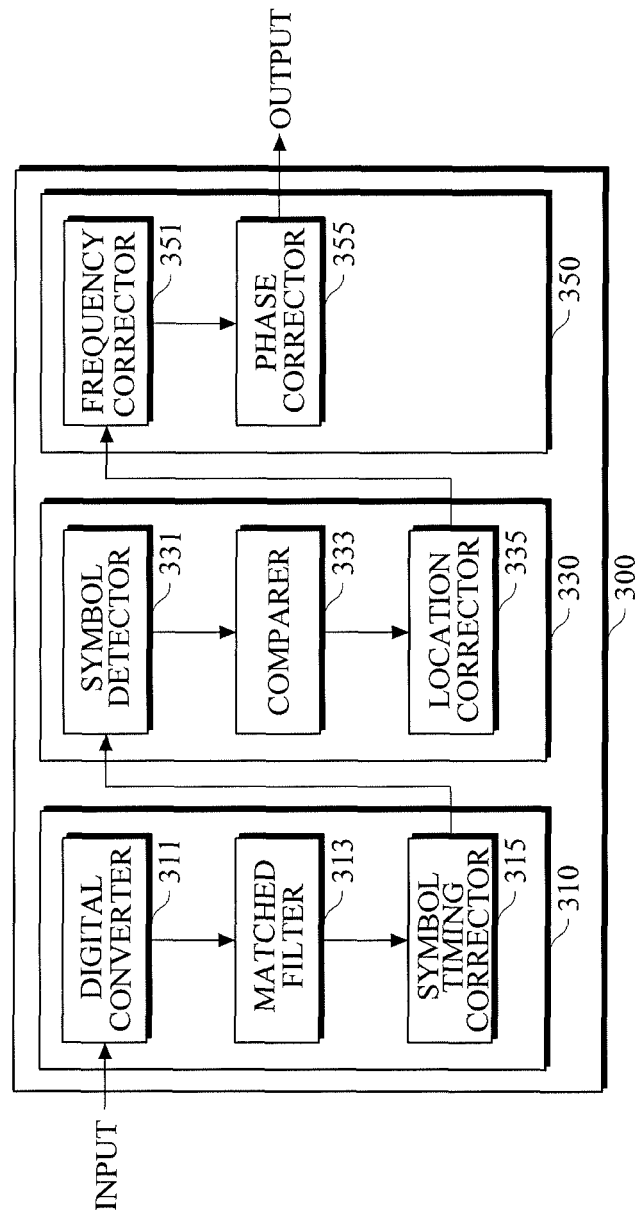
FIG. 3 is a diagram illustrating an example of a demodulation apparatus in a return link of a satellite system.

FIG. 3 illustrates a diagram of an example of a demodulation apparatus in a return link of a satellite system.

Referring to FIG. 3, the demodulation apparatus 300 may include a symbol timing synchronizing unit 310, a burst synchronizing unit 330, and a carrier recovering unit 350. The symbol timing synchronizing unit 310 may receive a bus through the return link of the satellite system. The symbol timing synchronizing unit 310 may synchronize a symbol timing of a received burst with reference symbol timing. The symbol timing synchronizing unit 310 may include a digital converter 311, a matched filter 313, and a symbol timing corrector 315. The digital converter 311 may convert a burst in the form of an analog signal into a digital signal. The matched filter 313 may perform matched-filtering on a baseband of the burst converted into digital. For example, baseband matched filtering according to roll-off factors may be available, and a resulting value is 0.2.

The symbol timing synchronizing unit 310 may synchronize symbol timing of the burst output from the matched filter 313 with the symbol timing of a reference burst. The symbol timing synchronizing unit may use Oerder & Myer algorithm to estimate a symbol timing error of the burst. The estimated symbol timing error is synchronized to the reference symbol timing. The timing-synchronized burst which has the symbol timing synchronized to the reference symbol timing is output to the burst synchronizing unit 330.

The burst synchronizing unit 330 may receive the timing-synchronized burst from the symbol timing synchronizing unit 310. The burst synchronizing unit 330 may use a preamble symbol and a post-amble symbol of the timing-synchronized burst to synchronize the location of the timing-synchronized burst to a location of the reference burst. The burst synchronizing unit 330 may include a symbol detector 331, a comparer 333, and a location corrector 335. The symbol detector 331 may detect the locations of the preamble symbol and the post-amble symbol of the timing-synchronized burst. The symbol detector 331 may output information about the detected locations of the preamble symbol and the post-amble symbol to the comparer 333.

The comparer 333 may compare the locations of the preamble symbol and the post-amble symbol. Specifically, the locations of the preamble symbol and the post-amble symbol of the received burst are compared with the locations of the preamble symbol and the post-amble symbol of a burst at a transmission end. Based on the comparison result, a type of the burst can be identified. In addition, the comparer 333 may determine a difference between the location of the received burst and the location of the reference burst at the transmission end. The comparer 333 may output the determination result to the location corrector 335. The location corrector 335 may receive location information from the comparer 333. If there is a difference between the location of the received burst and the location of the reference burst, the comparer 333 may synchronize the location of the received burst to the location of the reference burst.

The burst output from the burst synchronizing unit 330 has its symbol timing synchronized and its location synchronized to the location of the reference burst. The carrier recovering unit 350 may estimate and correct a frequency error and a phase error with respect to the location-synchronized burst. The carrier recovering unit 330 may include a frequency corrector 351 to estimate and correct a frequency error of a burst and a phase corrector 355 to estimate and correct a phase error of the burst. The frequency corrector 351 may determine whether the location-synchronized burst has a pilot symbol or not. If the pilot symbol is present, the frequency corrector 351 may estimate the frequency error using a data-aided scheme, and otherwise, may estimate the frequency error using a blind scheme.

The phase corrector 355 may compare the preamble symbol and the post-amble symbol of the received location-synchronized burst with the preamble symbol and the post-amble symbol of the burst at the transmission end and calculate a correlation value therebetween. In this case, digital phase lock loop is applied to estimate and correct the phase error of the received burst.

Figure 4:
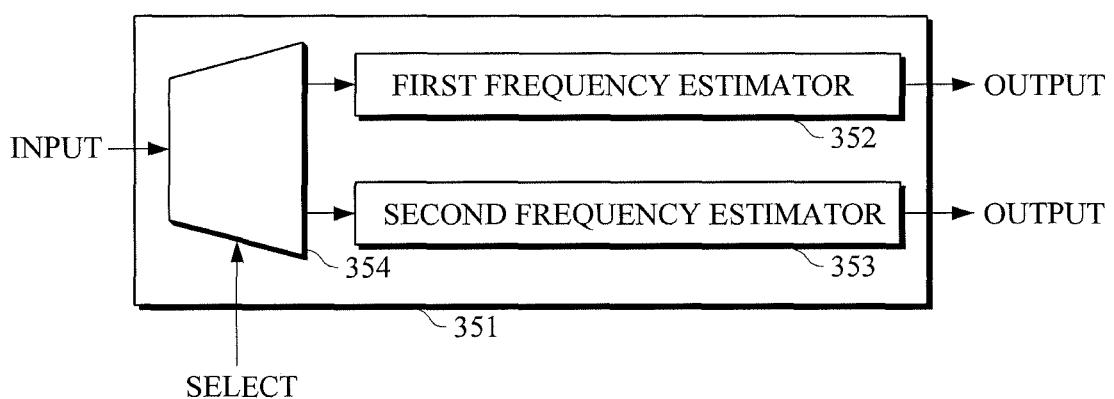
FIG. 4 is a diagram illustrating an example of a frequency corrector in a modulation apparatus.

FIG. 4 illustrates a diagram of an example of a frequency corrector in a modulation apparatus.

Referring to FIG. 4, the frequency corrector 351 may include a first frequency estimator 352, a second frequency estimator 353, and a selector 354. The first frequency estimator 352 may estimate a frequency error of a location-synchronized burst using a data-aided scheme. The second frequency estimator 353 may estimate a frequency error of the location-synchronized burst using a blind scheme. The selector 354 may transmit the location-synchronized burst to the first estimator when receiving a selection signal that is a detection signal for notifying that a pilot symbol is detected in the location-synchronized burst, and, if a pilot symbol is not detected, may transmit the location-synchronized burst to the second estimator. The selection signal of the selector 354 is information about the presence of the pilot symbol in the received burst.

Figure 5A:
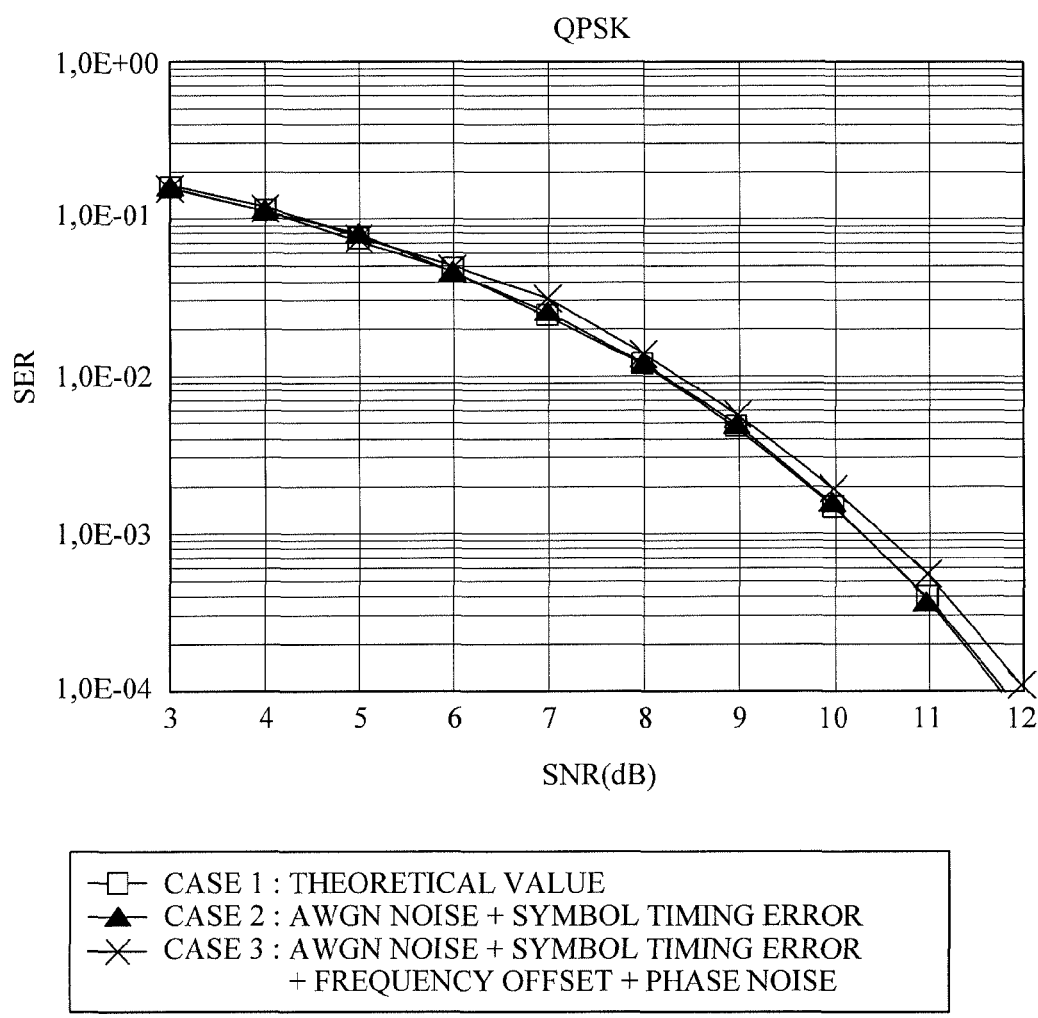
FIG. 5A is a graph of an example of frequency gain according to QPSK demodulation/modulation.
Figure 5B:
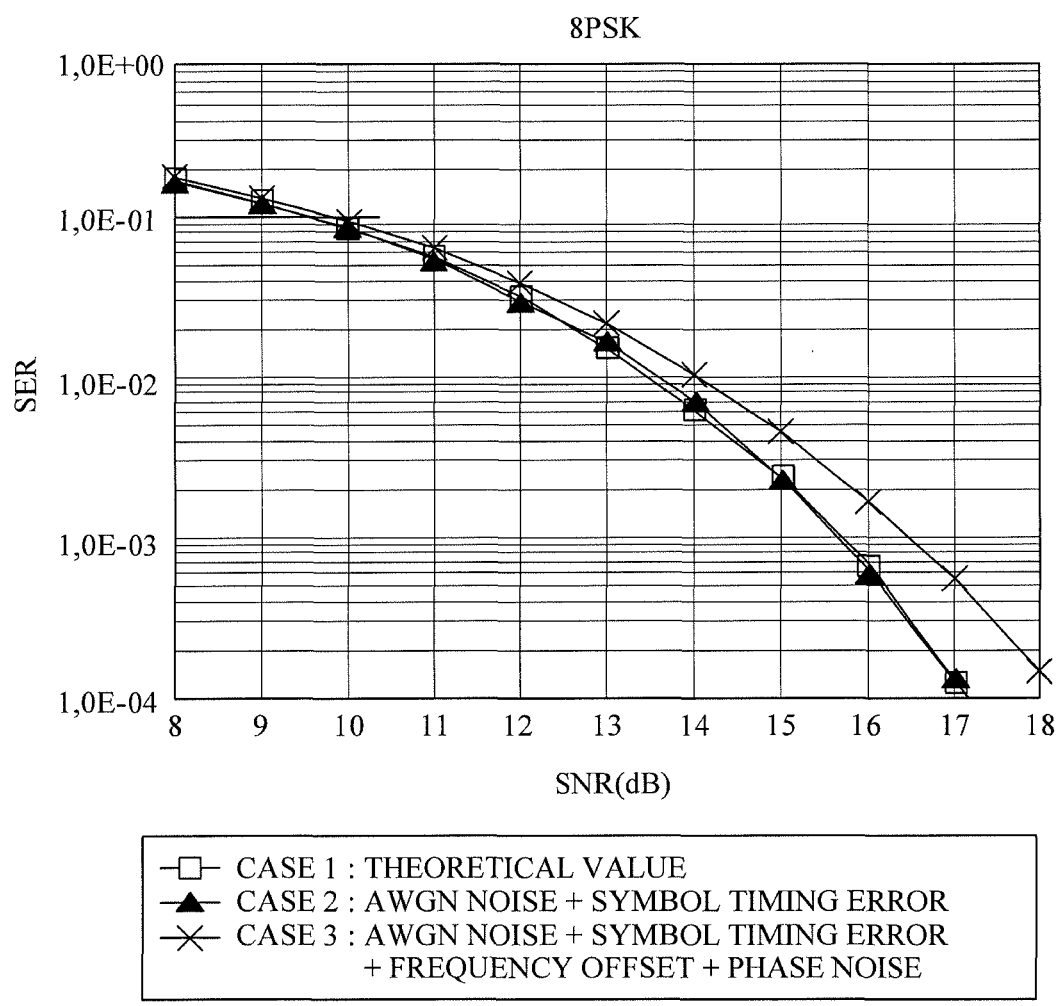
FIG. 5B is a graph of an example of frequency gain according to 8PSK demodulation/modulation.

FIG. 5A illustrates a graph of an example of frequency gain according to QPSK demodulation/modulation, and FIG. 5B illustrates a graph of an example of frequency gain according to 8PSK demodulation/modulation.

In FIG. 5A, a result of modulating a burst that has been demodulated in QPSK is represented as a signal-to-noise ratio (SNR) along a horizontal axis and as a symbol error rate along a vertical axis. CASE 1 represents a theoretical result, CASE 2 represents a result when an additive white Gaussian noise (AGWN) and a symbol timing error are added to an ideal signal, and CASE 3 represents a result when AGWN, a symbol timing error, a frequency offset, and a phase noise are added to the ideal signal.

In FIG. 5B, a result of modulating a burst that has been demodulated in 8PSK is represented as SNR along a horizontal axis and as a symbol error rate along a vertical axis. Like the example shown in FIG. 5A, CASE 1 represents a theoretical result, CASE 2 represents a result when an additive white Gaussian noise (AGWN) and a symbol timing error are added to an ideal signal, and CASE 3 represents a result when AGWN, a symbol timing error, a frequency is offset, and a phase noise are added to the ideal signal.

Figure 6:
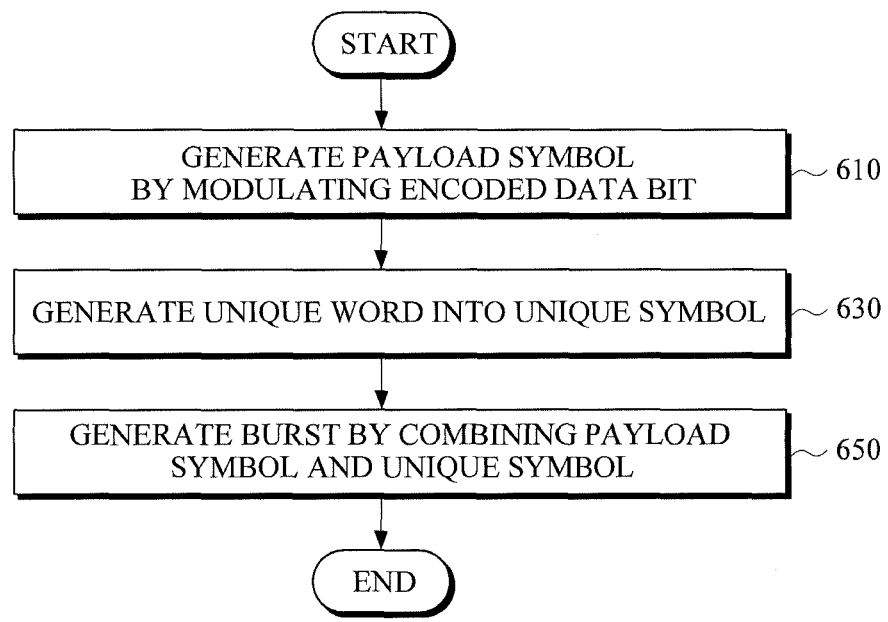
FIG. 6 is a flowchart illustrating an example of a modulation method in a return link of a satellite system.

FIG. 6 illustrates a flowchart of an example of a modulation method in a return link of a satellite system.

Referring to FIG. 6, an encoded data bit is modulated in a predefined modulation scheme to generate a payload symbol (610). The modulation scheme may be, for example, QPSK, 8PSK, and 16-quadrature amplitude modulation (16-QAM). Each of QPSK and 8PSK is a single-level modulation scheme, and 16-QAM is a multi-level modulation scheme.

According to a type of the burst, a unique word is generated into at least one unique symbol, such as a preamble symbol, a post-amble symbol, and a pilot symbol (630). Here, the unique symbol refers to a symbol other than a payload symbol. The type of a burst may include a log on burst, a control burst, and a traffic burst. The traffic burst may be classified into a short traffic burst (STB) and a long traffic burst (LTB) based on the length of a symbol.

A burst is formed by combining the payload symbol and the at least one unique symbol (650). The structure of the burst is the same as described above with reference to FIGS. 2A and 2B. The payload symbol and the pilot symbol are placed between a preamble symbol and a post-amble symbol as the unique symbol. In this case, the mapping of the pilot symbol is selectively performed. In the case of mapping the pilot symbol, the pilot symbol is mapped alternately with the payload symbol in a defined section. Guard time is assigned between successive bursts to form one time slot. The guard time is to prevent burst collision.

Figure 7:
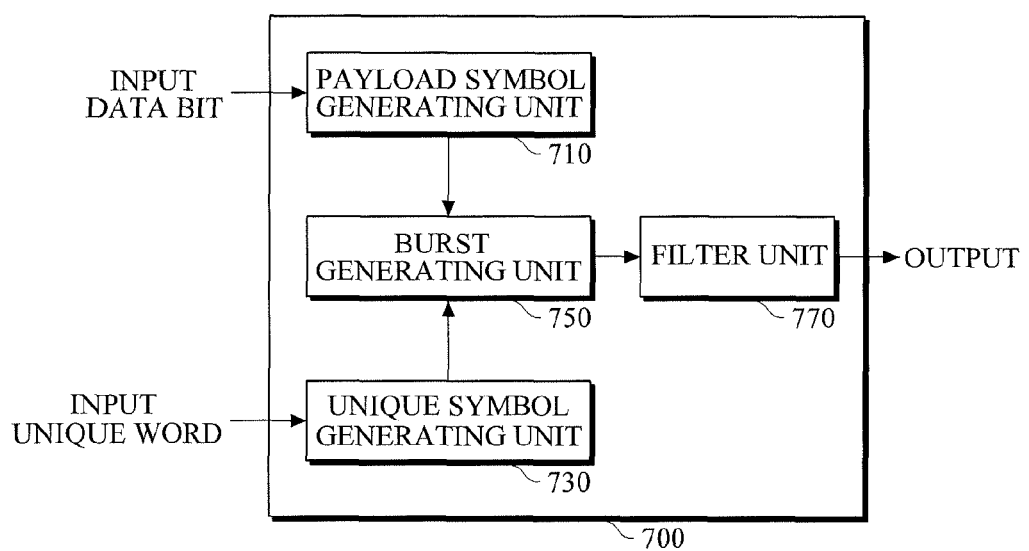
FIG. 7 is a diagram illustrating an example of a modulating apparatus in a return link of a satellite system.

FIG. 7 illustrates a diagram of an example of a modulating apparatus in a return link of a satellite system.

Referring to FIG. 7, the modulating apparatus 700 may include a payload symbol generating unit 710, a unique symbol generating unit 730, a burst generating unit 750, and a filter unit 770. The payload symbol generating unit 710 may receive an encoded data bit from an external channel encoder block. The payload symbol generating unit 710 may modulate the received data bit in a predefined modulation scheme including QPSK, 8PSK, and 16QAM to generate a payload symbol. The generated payload symbol is output to the burst generating unit 750.

The unique symbol generating unit 730 may generate unique words into a preamble symbol, a post-amble symbol, and a pilot symbol according to a type of a burst. A unique symbol refers to a symbol other than a pilot symbol. The pilot symbol provides critical information for determining a demodulation scheme of a burst. A length of each of the preamble symbol and the post-amble symbol is differentiated according to the type of a burst. The unique symbol generating unit 730 may output the generated preamble symbol, post-amble symbol, and pilot symbol to the burst generating unit 750.

The burst generating unit 750 may receive the symbols from the payload symbol generating unit 710 and the unique symbol generating unit 730. The burst generating unit 750 may generate a burst by combining the input symbols. The structure of the generated burst is described with reference to FIGS. 2A and 2B. The burst generating unit 750 may differentiate the symbol mapping according to the type of a burst. In addition, the lengths of the preamble symbol, the payload symbol and the post-amble symbol, and data content are differentiated according to the type of a burst. The burst generating unit 750 may output the generated burst to the filter unit 770.

The filter unit 770 is a filter for baseband shaping. As a pulse shaping filter, for example, square root raised cosine (SRRC) filter is used. In this case, roll-off factor for shaping a pulse of baseband is 0.2. The filter unit 770 may generate a pulse of baseband with respect to the input burst. In addition, the filter unit 770 may use a cascaded integrator comb (CIC) filter or a Hogenauer filter. The CIC filter consists of simply an adder, a subtractor, and a register. The filter unit 770 may perform baseband shaping on the input burst, and perform CIC filtering to compensate for signal distortion due to the change in sampling rate. The burst generated by the filter unit 770 is output to an analog block and transmitted as an analog signal to the transmission end through the return link.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of demodulating a signal in a return link of a satellite system, comprising:
    estimating symbol timing of a burst received through the return link of the satellite system and synchronizing the estimated symbol timing of the burst to reference symbol timing;
    synchronizing a location of the timing-synchronized burst having the symbol timing synchronized to a location of a reference burst using a preamble symbol and a post-amble symbol of the timing-synchronized burst; and
    recovering a carrier of the location-synchronized burst whose location has been synchronized to the location of the reference burst using a pilot symbol of the location-synchronized burst.

2. The method of claim 1, wherein the recovering of the carrier comprises estimating a frequency error of the location-synchronized burst and correcting the estimated frequency error and estimating a phase error of the location-synchronized burst and correcting the estimated phase error.

3. The method of claim 2, wherein the estimating of the frequency error of the location-synchronized burst comprises estimating the frequency error using a data-aided scheme when a pilot symbol is present in the location-synchronized burst, and estimating the frequency error using a blind scheme when a pilot symbol is not present in the location-synchronized burst.

4. The method of claim 1, wherein the burst includes at least one symbol of a preamble symbol, a post-amble symbol, a payload symbol, and a pilot symbol.

5. The method of claim 1, wherein the burst includes payload symbols and pilot symbols which are alternately arranged between a preamble symbol and a post-amble symbol.

6. An apparatus for demodulating a signal in a return link of a satellite system, comprising:
    a symbol timing synchronizing unit configured to synchronize symbol timing of a burst received through the return link of the satellite system to reference symbol timing;
    a burst synchronizing unit configured to synchronize a location of the timing-synchronized burst of which the symbol timing has been synchronized by the symbol timing synchronizing unit to a location of a reference burst using a preamble symbol and a post-amble symbol of the timing-synchronized burst; and
    a carrier recovering unit configured to recover a carrier of the location-synchronized burst of which the location has been synchronized by the burst synchronizing unit using a pilot symbol of the location-synchronized burst.

7. The apparatus of claim 6, wherein the symbol timing synchronizing unit is further configured to comprise a digital converter configured to perform analog/digital conversion on the received burst, a matched filter configured to perform matched filtering on the digitized burst, and a symbol timing corrector configured to estimate and correct a symbol timing error of the digitized burst.

8. The apparatus of claim 6, wherein the burst synchronizing unit is further configured to comprise a symbol detector configured to detect locations of a preamble symbol and a post-amble symbol of the timing-synchronized burst, a comparer configured to compare the locations of the preamble symbol and the post-amble symbol, and a location corrector configured to correct the location of the timing-synchronized burst to the location of the reference burst according to the comparison result from the comparer.

9. The apparatus of claim 6, wherein the carrier recovering unit is further configured to comprise a frequency corrector configured to estimate a frequency error of the location-synchronized burst according to the presence of the pilot symbol and correct the estimated frequency error, and a phase corrector configured to estimate and correct a phase error of the location-synchronized burst.

10. The apparatus of claim 9, wherein the frequency corrector is further configured to comprise a first estimator configured to estimate a frequency error of the location-synchronized burst using a data-aided scheme, a second estimator configured to estimate a frequency error of the location-synchronized burst using a blind scheme, and a selector configured to transmit the location-synchronized burst to the first estimator if a pilot symbol of the location-synchronized burst is detected, and transmit the location-synchronized burst to the second estimator when the pilot symbol is not detected wherein a detection signal of the pilot signal is selectively input.

* * * * *